US012595807B2

(12) United States Patent (10) Patent No.: US 12,595,807 B2
Kileen et al. (45) Date of Patent: Apr. 7, 2026

(54) DOME BLOWER WHEEL ATTACHMENT TO MINIMIZE WATER INTRUSION

(71) Applicant: Hanon Systems, Daejeon (KR)

(72) Inventors: Benjamin D. Kileen, Ferndale, MI (US); Ted A. Vanden Berg, Waterford, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/894,831

(22) Filed: Sep. 24, 2024

(65) Prior Publication Data

US 2026/0085694 A1     Mar. 26, 2026

(51) Int. Cl.
   F04D 29/28      (2006.01)
   F04D 17/08      (2006.01)
   F04D 29/58      (2006.01)
   H02K 9/06      (2006.01)
(52) U.S. Cl.
   CPC ........... F04D 29/281 (2013.01); F04D 17/08 (2013.01); F04D 29/584 (2013.01); H02K 9/06 (2013.01)
(58) Field of Classification Search
   CPC ...... F04D 17/10; F04D 17/105; F04D 29/281; F04D 29/283; F04D 29/584; H02K 9/06
   USPC ............................ 310/62; 416/180, 182, 183
   See application file for complete search history.

(56) References Cited

U.S. PATENT DOCUMENTS

| | | | | |
|---|---|---|---|---|
| 5,814,908 | A | * | 9/1998 | Muszynski ......... F04D 29/5806 310/58 |
| 2014/0003947 | A1 | | 1/2014 | Iyer et al. |
| 2018/0219446 | A1 | * | 8/2018 | Yamada .............. H02K 5/1737 |
| 2021/0115931 | A1 | | 4/2021 | Jang et al. |

FOREIGN PATENT DOCUMENTS

| | | | | |
|---|---|---|---|---|
| DE | 19909507 | C1 | * 11/2000 | ......... F04D 29/5806 |
| JP | H07332291 | A | * 12/1995 | |
| JP | 10176696 | A | 6/1998 | |
| JP | 10191595 | A | 7/1998 | |
| JP | 2016191310 | A | 11/2016 | |

OTHER PUBLICATIONS

Heinrich et al., 'Radial Blowers, Especially for Heating and Air Conditioning Systems' Mach. Trans. DE 19909507 (Year: 2000).*

* cited by examiner

*Primary Examiner* — Kenneth J Hansen
(74) *Attorney, Agent, or Firm* — Shumaker, Loop & Kendrick, LLP; James D. Miller

(57) ABSTRACT

A rotatable dome blower wheel attachment that mitigates a risk of water droplets infiltrating a rotor and a motor. The dome blower wheel attachment may be rotatably coupled to the shaft of the blower motor and to the blower motor wheel to protect the rotor from water that is sprayed through the wheel. The coupling also ensures that the dome blower wheel attachment rotates with the blower motor shaft, the wheel, and the rotor. The dome blower wheel attachment may also have impellers coupled to the underside of the dome to direct airflow and water droplets away from the rotor while still protecting the rotor from water that is directed through the wheel.

9 Claims, 14 Drawing Sheets

DOME BLOWER WHEEL ATTACHMENT TO MINIMIZE WATER INTRUSION

FIELD

The present invention relates generally to attachments for motors. In particular, the invention is directed to a rotating dome blower wheel attachment for blower motors that militates against intrusion of water and provides motor cooling.

BACKGROUND OF THE INVENTION

A blower motor assembly is typically used in a multitude of capacities, including, but not limited to, computers, HVAC systems, processing equipment, home appliances, and automobiles. In an HVAC context, the blower motor is a component that pushes hot or cold air out of the unit and into the space being ventilated. An HVAC blower motor assembly may also be used in automobiles in parts and systems like radiators, air conditioning condensers, and air intercoolers.

The blower motor assembly has many components, including a motor, a wheel, a rotor, a housing, fuses, relays, and optionally a resistor. The motor in the blower motor assembly may be brushed or brushless. Brushed motors are a traditional design and are mostly found in the blower assemblies of older automobiles, whereas many newly manufactured automobiles are equipped with brushless blower motors. The blower motor wheel may also be called a cage due to its design. The blower motor wheel comprises an annular array of fan blades arranged to channel or direct air when rotated by a shaft that connected to the motor and the rotor. The wheel enables the blower motor to direct sufficient hot or conditioned air to an interior of a passenger cabin of the automobile. Finally, the housing includes the blower motor rotor and a cover that protects against debris and other material that may damage the motor. The housing also provides a mounting surface to attach the assembly to the automobile.

The rotor and the fan convey air through a heater core of the HVAC system to heat the passenger cabin, or to an evaporator of the air conditioner system to cool the passenger cabin. The amount of air moved depends on a speed of the motor. Blower motor speed control methods vary depending on whether the motor is a brushed or brushless motor. Brushed motors rely on a resistor to change the speed, whereas brushless motors use an electronic circuit called a control module.

Known blower motors suffer from a multitude of issues, especially given a location and a function within a vehicle. In particular, the blower motors may suffer mechanical issues or electrical issues if water is permitted to enter the fan blades of the wheel and onto the surface of the rotor. The water may also enter the motor, causing mechanical or electric issues within the motor through corrosion or short circuiting. Additionally, the wheel assembly typically creates an upwards airflow. The upwards airflow spreads water droplets over the retaining wall formed by the flange of the blower motor housing and into the motor, thereby causing the same mechanical or electric issues within the motor.

Prior designs mitigate the risk of water spraying through the wheel and onto the rotor by including a stationary dome that is placed on top of the rotor. This prior design, however, does not adequately protect the rotor from the upwards airflow that spreads water droplets over the retaining wall formed by the flange of the blower motor housing and into the motor. The prior design is also overly expensive and complicated, and requires a specialized flange tool for installation.

Thus, it is highly desirable to provide a blower motor wheel or rotor attachment that cures this deficiency.

SUMMARY

In harmony and accordance with the present disclosure, a rotatable dome blower wheel attachment is surprisingly discovered.

A rotatable dome blower wheel attachment that mitigates a risk of water droplets infiltrating the rotor and the motor cures the deficiency of prior wheel attachments for blower motors. The dome blower wheel attachment is also cheaper and less complicated than wheel attachments of prior art, does not require a specialized flange tool for installation, and does not attach directly to the housing. The dome blower wheel attachment may be coupled to the output shaft of the blower motor and to the blower motor wheel to protect the rotor from water that is sprayed through the wheel. This coupling also ensures that the dome blower wheel attachment rotates with the blower motor shaft, wheel, and rotor. The dome blower wheel attachment may also have impellers coupled to an underside of the dome to serve a dual purpose of directing airflow, and therefore water droplets, away from the rotor while still protecting the rotor from water that is sprayed through the wheel.

In an embodiment of the present disclosure, a rotatable dome blower wheel attachment includes a connection flange having a first end configured to be rotatably coupled to an output shaft of a blower motor assembly and a semi-spherical dome coupled to a second end of the connection flange. The dome further includes one or more radially outwardly extending impellers formed on an underside of the dome.

As an aspect of an additional embodiment, the connection flange includes a first end with one or more interlocking ribs.

As an aspect of an additional embodiment, the connection flange includes an axially extending aperture formed in the connection flange between the first end and second end thereof.

As an aspect of an additional embodiment, the dome includes a first end and a second end opposite the first end, the second end having an opening formed therein and a larger circumference than the first end.

As an aspect of an additional embodiment, wherein the one or more radially outwardly extending impellers are arcuate.

As an aspect of an additional embodiment, wherein the dome covers a rotor.

As an aspect of an additional embodiment, wherein the rotatable dome blower wheel attachment is configured to protect a blower motor from short circuiting due to water infiltration.

As an aspect of an additional embodiment, wherein a first gap is formed between the dome and an inner wall of a flange of a blower motor housing.

As an aspect of an additional embodiment, wherein an area of the first gap is larger than an area of a blower motor air inlet.

As an aspect of an additional embodiment, wherein a second gap is formed between the dome and a bottom wall of the flange of the blower motor housing.

As an aspect of an additional embodiment, wherein a measurement of the second gap exceeds 6 mm.

In another embodiment of the present disclosure, a blower motor assembly includes a motor housing, a blower motor disposed in the motor housing, a rotatable rotor coupled to the blower motor, a rotatable output shaft coupled to the rotor, a rotatable blower motor wheel coupled to the output shaft and a rotatable dome blower wheel attachment coupled to the output shaft. The dome blower wheel attachment further includes a connection flange having a first end configured to be rotatably coupled to an output shaft of a blower motor assembly and a semi-spherical dome coupled to a second end of the connection flange, the dome having one or more radially outwardly extending impellers formed on an underside of the dome.

As an aspect of an additional embodiment, the motor housing includes one or more blower motor air inlets formed in the motor housing.

As an aspect of an additional embodiment, wherein a first gap is formed between the dome and an inner wall of a flange of the blower motor housing.

As an aspect of an additional embodiment, wherein an area of the first gap is larger than an area of the one or more blower motor air inlets.

As an aspect of an additional embodiment, wherein a second gap is formed between the dome and a bottom wall of the flange of the blower motor housing.

As an aspect of an additional embodiment, the connection flange includes a first end with one or more interlocking ribs and a second end opposite the first end.

As an aspect of an additional embodiment, the connection flange includes an axially extending aperture formed in the connection flange between the first end and second end thereof.

As an aspect of an additional embodiment, the dome includes a first end and a second end opposite the first end, the second end having an opening formed therein and a larger circumference than the first end.

As an aspect of an additional embodiment, wherein the one or more radially outwardly extending impellers are arcuate.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes for selected embodiments and not all possible implementations, and are not intended to limit the scope of the present disclosure.

DETAILED DESCRIPTION OF THE INVENTION

Figure 1:
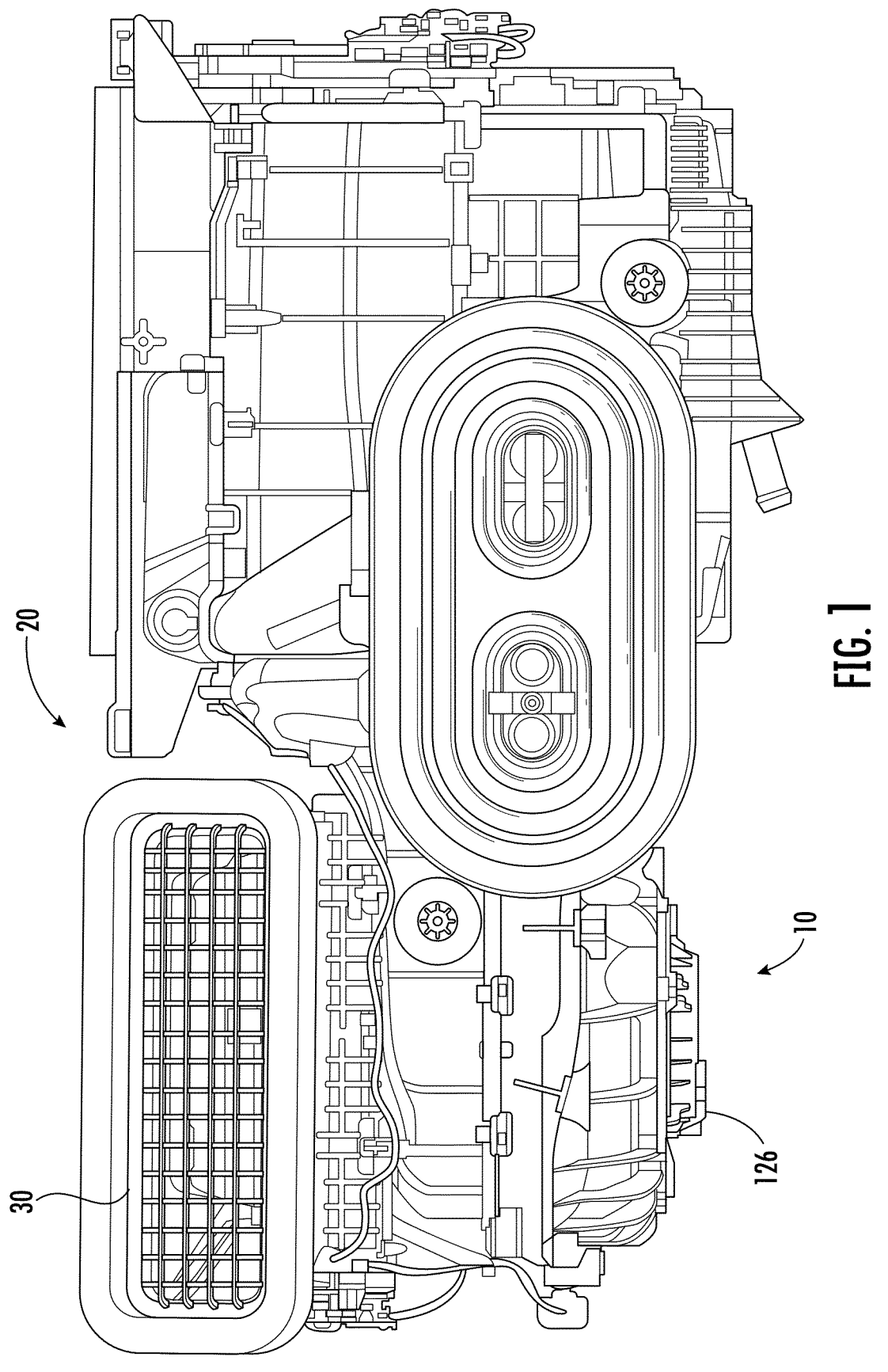
FIG. 1 is a right side elevational view of an automotive ventilation unit in accordance with an embodiment of the present invention.

The following description of technology is merely exemplary in nature of the subject matter, manufacture, and use of one or more disclosures, and is not intended to limit the scope, application, or uses of any specific disclosure claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
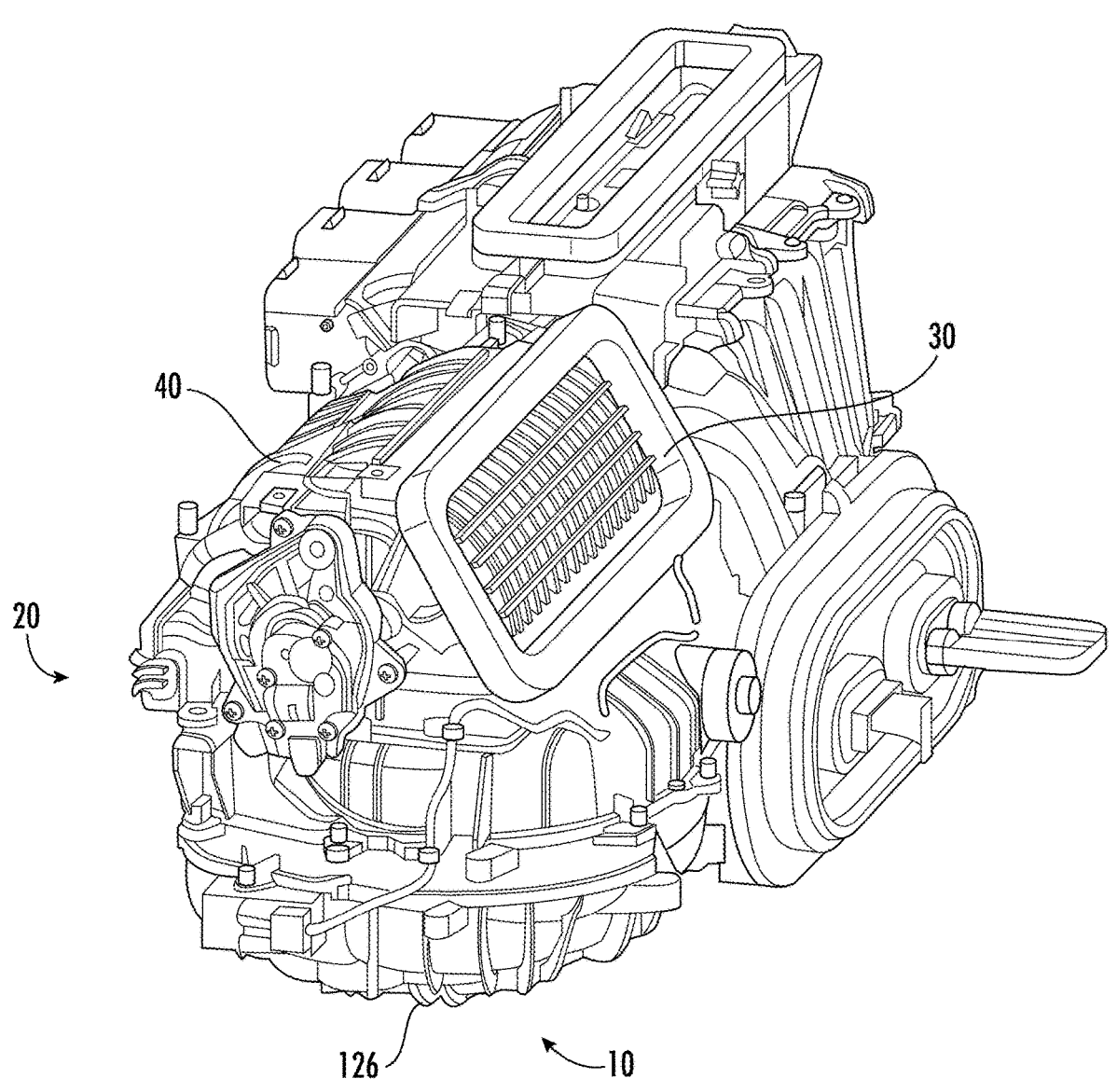
FIG. 2 is a top perspective view of the automotive ventilation unit of FIG. 1.
Figure 3:
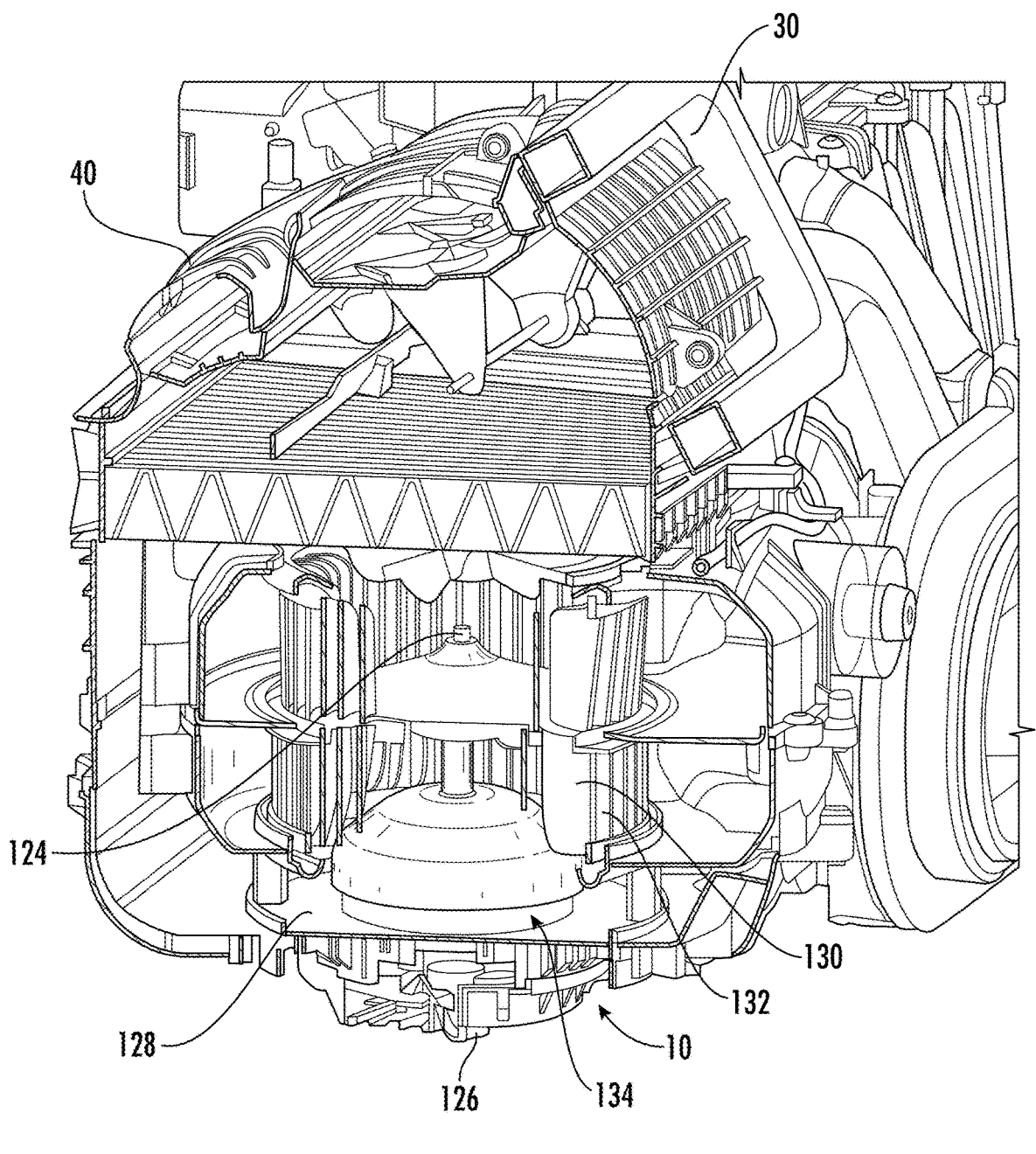
FIG. 3 is an enlarged fragmentary cross-sectional view of the embodiment of FIGS. 1-2 of a rotatable dome blower wheel attachment, a blower motor assembly, and the automotive ventilation unit.

An embodiment of a rotatable dome blower wheel attachment 100 described herein is best understood with reference to FIGS. 1-14. As illustrated in FIGS. 1-2, the dome blower wheel attachment 100 is operably coupled to a blower motor assembly 10. The blower motor assembly 10, in turn, is operably coupled an automotive ventilation unit 20. The automotive ventilation unit 20 typically includes the blower motor assembly 10, an HVAC fresh air inlet 30, and an HVAC recirculated air inlet 40, amongst other components. As illustrated in FIG. 3, the blower motor assembly 10 may be disposed within the automotive ventilation unit 20.

Figure 4:
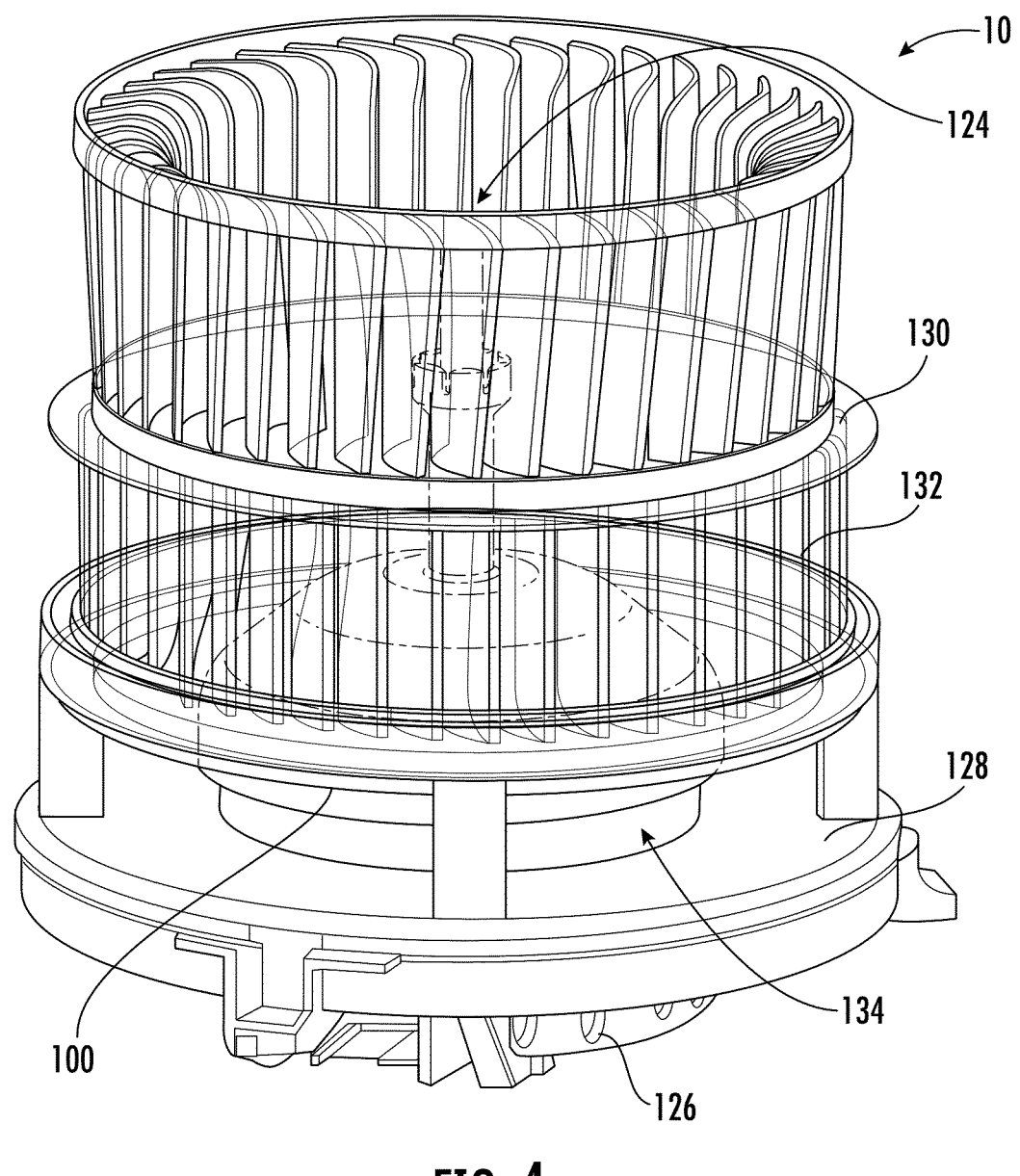
FIG. 4 is a front perspective view of the blower motor assembly of FIG. 3.

The blower motor assembly 10 according to an embodiment includes a housing 128 containing a blower motor 126 rotatably coupled to a rotor 134 as further illustrated by FIGS. 3-4. The housing 128 includes one or more blower motor air inlets 140. The blower motor assembly 10 also includes an output shaft 124 that is rotatably coupled to the blower motor 126 and the rotor 134. The housing 128, the blower motor 126, the rotor 134, and the output shaft 124 may be formed from any material as desired having desired properties such as a plastic, for example, and may be coupled to one another by any suitable method such as through use of a connecting member, for example. The blower motor assembly 10 also includes a blower motor wheel 130 having an annular array of fan blades 132. In one embodiment, the blower motor wheel 130 is also rotatably coupled to the output shaft 124, causing the blower motor wheel 130 to rotate at a same speed and in a same direction as the output shaft 124. The blower motor wheel 130 may be produced from any suitable material having desirable properties such as a plastic, for example, and may be rotatably coupled to the output shaft 124 using any suitable method such as by a fastener or press fitting, for example. The blower motor assembly 10 may be used for an air conditioning unit of a vehicle (not illustrated). It is understood that the blower motor assembly 10 can be used in other applications as desired.

Figure 5:
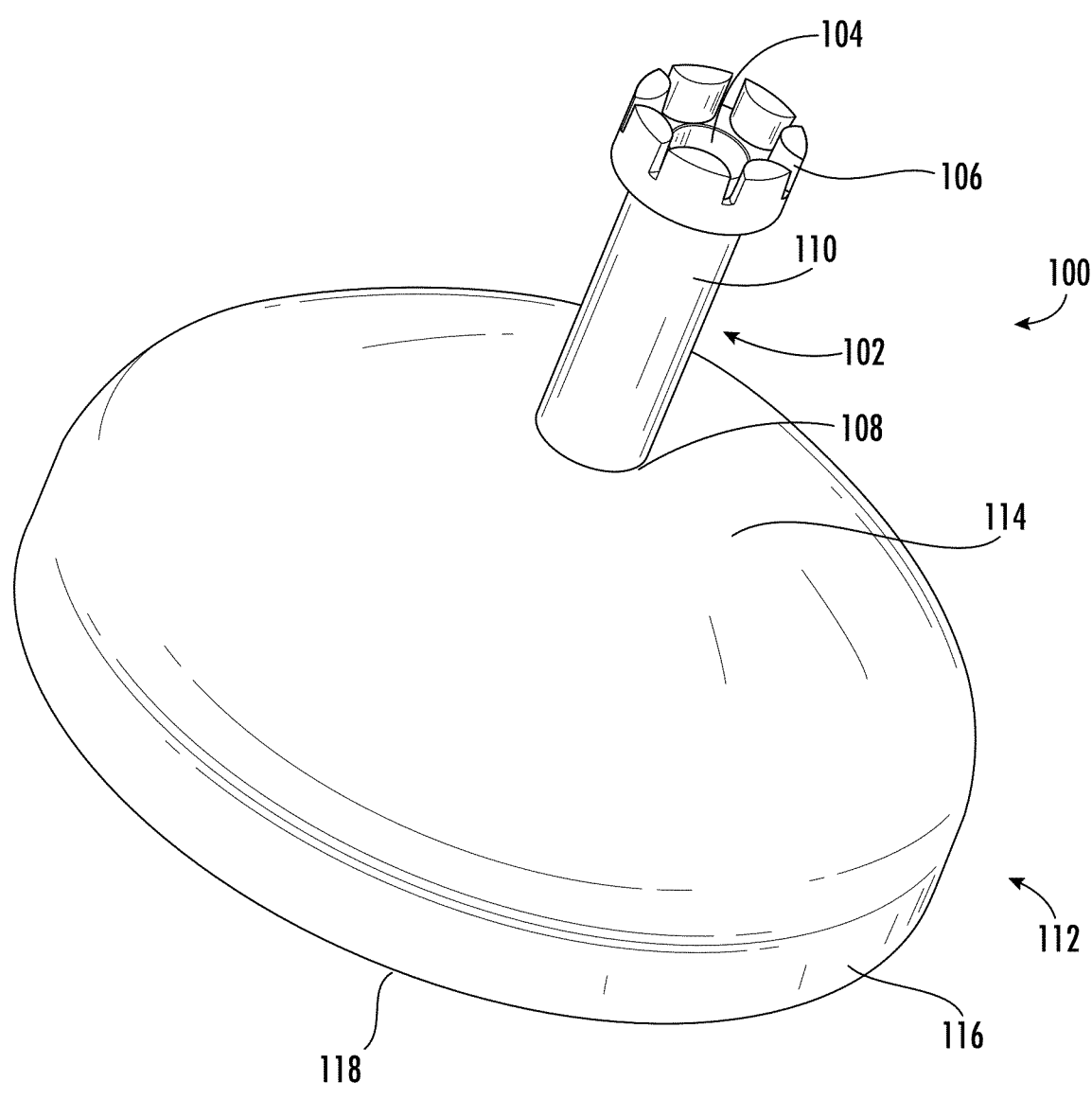
FIG. 5 is a top perspective view of the dome blower wheel attachment of FIGS. 3-4.
Figure 6:
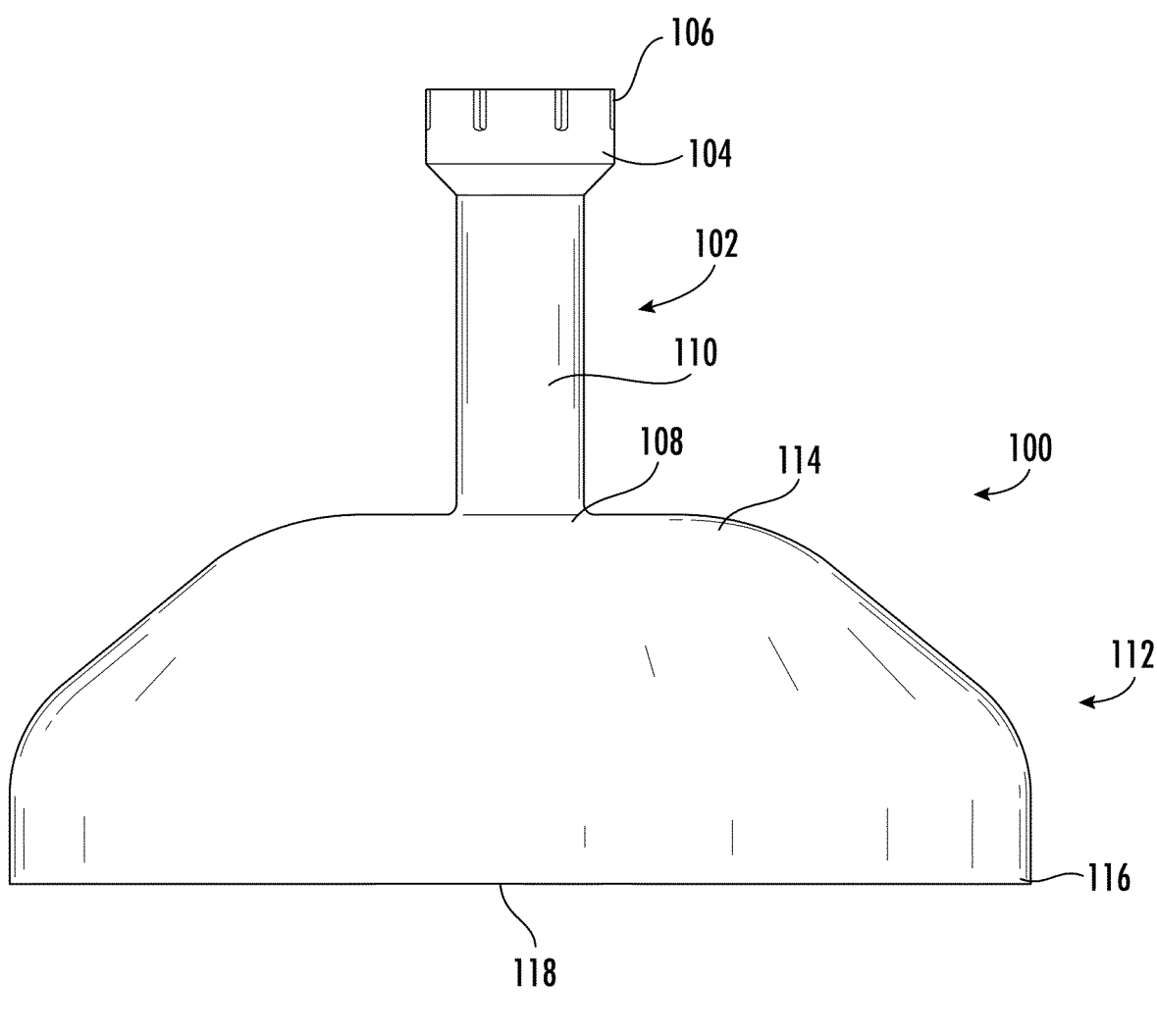
FIG. 6 is a front elevational view of the dome blower wheel attachment.

The dome blower wheel attachment 100, best illustrated in FIGS. 5-6, includes a connection flange 102 with a first end 104 and a second end 108. The first end 104 of the connection flange 102 has one or more interlocking ribs 106. The one or more interlocking ribs 106 may facilitate a connection between the connection flange 102 and the blower motor wheel 130 by interlocking with matching ribs (not illustrated) coupled to the blower motor wheel 130. The connection flange 102, the first end 104, the second end 108, and the interlocking ribs 106 may be produced from any suitable material. In one embodiment, the connection flange 102 and its components are produced from a plastic such as polypropylene. The one or more interlocking ribs 106 allow for the connection flange 102, and thereby the dome blower wheel attachment 100, to be rotatably coupled to the blower motor wheel 130.

The connection flange 102 may include an aperture 110 formed along a central axis thereof. The hollow channel 110 may have any diameter as desired. In one embodiment, the hollow channel 110 has a diameter that is marginally larger than circumference diameter of the output shaft 124 of the blower motor 126.

The second end of the connection flange 102 is coupled to a first end 114 of a semi-spherical dome 112, as further illustrated in FIGS. 5-6. The first end 114 of the dome 112 may be coupled to the connection flange 102 through any suitable method as desired, or may be formed as a unitary structure with the dome 112. The dome 112 also has a second end 116 with an opening 118 formed therein. The opening 118 may have any diameter as desired. In one embodiment, the opening 118 has a diameter larger than a diameter of the first end 114 of the dome 112. This allows the opening 118 of the dome 112 to adequately cover the rotor 134 of the blower motor 126 and protect the rotor 134 from water intrusion. The dome 112 may be formed from any suitable material. In one embodiment, the dome 112 is formed from a plastic such as a polypropylene.

Figure 7:
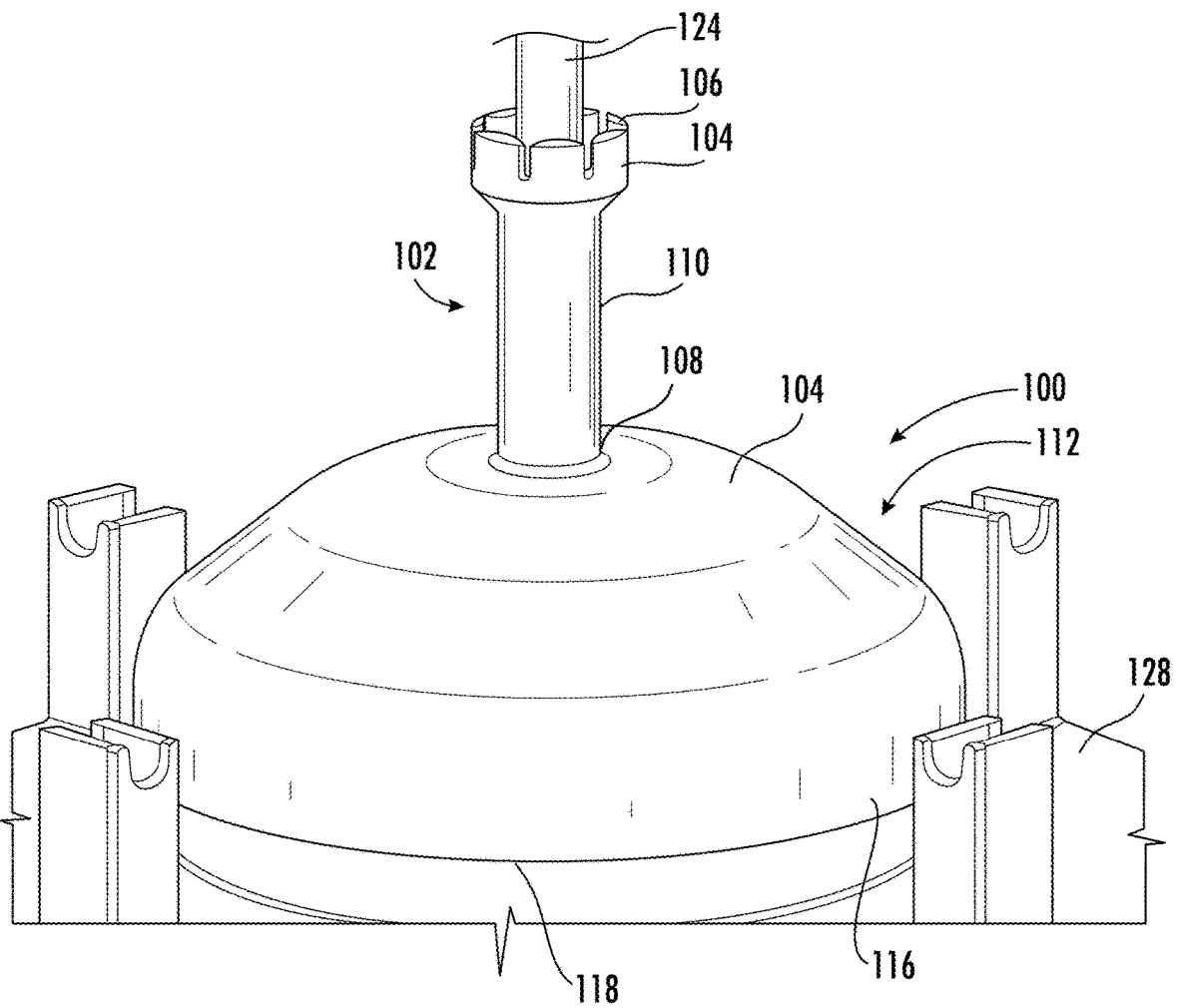
FIG. 7 is an enlarged top perspective view of the dome blower wheel attachment, a housing, and an output shaft.

In one embodiment, as illustrated by FIG. 7, the dome blower wheel attachment 100 is rotatably coupled to the output shaft 124, causing the dome blower wheel attachment 100 to rotate at the same speed and in the same direction of the output shaft 124. The dome blower wheel attachment 100 may be rotatably coupled to the output shaft 124 by any suitable method as desired. In one embodiment, the dome blower wheel attachment 100 is press fit onto the output shaft 124 during assembly of the blower motor assembly 10. A secure press fit may be achieved if the diameter of the aperture 110 is marginally larger than the diameter of the output shaft 124 of the blower motor 126. In another embodiment, the dome blower wheel attachment 100 may be secured to the output shaft 124 by a connecting member (not illustrated), such as a clip, a screw, or other suitable method as desired.

The dome blower wheel attachment 100 may be coupled to the output shaft 124 such that it allows the dome blower wheel attachment 100 to cover and protect the rotor 134 of the blower motor assembly 10. This placement enables the dome blower wheel attachment 100 to protect the rotor 134 from water droplets that infiltrate the automotive ventilation unit 20 and the blower motor assembly 10 through the HVAC fresh air inlet 30 and the HVAC recirculated air inlet 40. When water droplets infiltrate the automotive ventilation unit 20 and the blower motor assembly 10, the dome blower wheel attachment 100 covers the rotor 134 and acts as a splashguard, thereby preventing the water droplets from penetrating the rotor 134 and the blower motor 126. This, in turn, prevents the rotor 134, the blower motor 126, and other key elements of the blower motor assembly 10 from corrosion or short circuiting.

Figure 8:
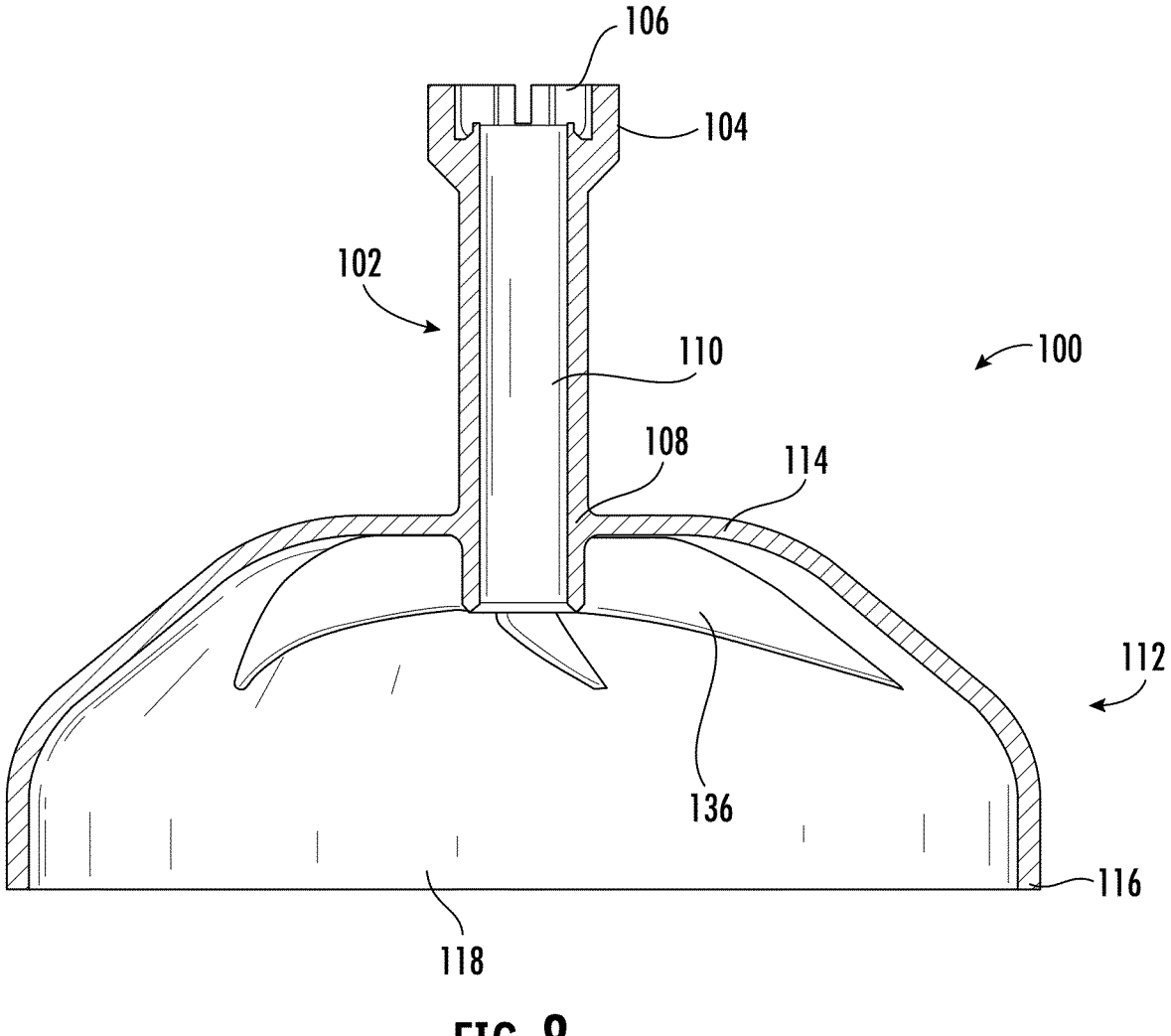
FIG. 8 is a cross-sectional elevational view of the dome blower wheel attachment.
Figure 9:
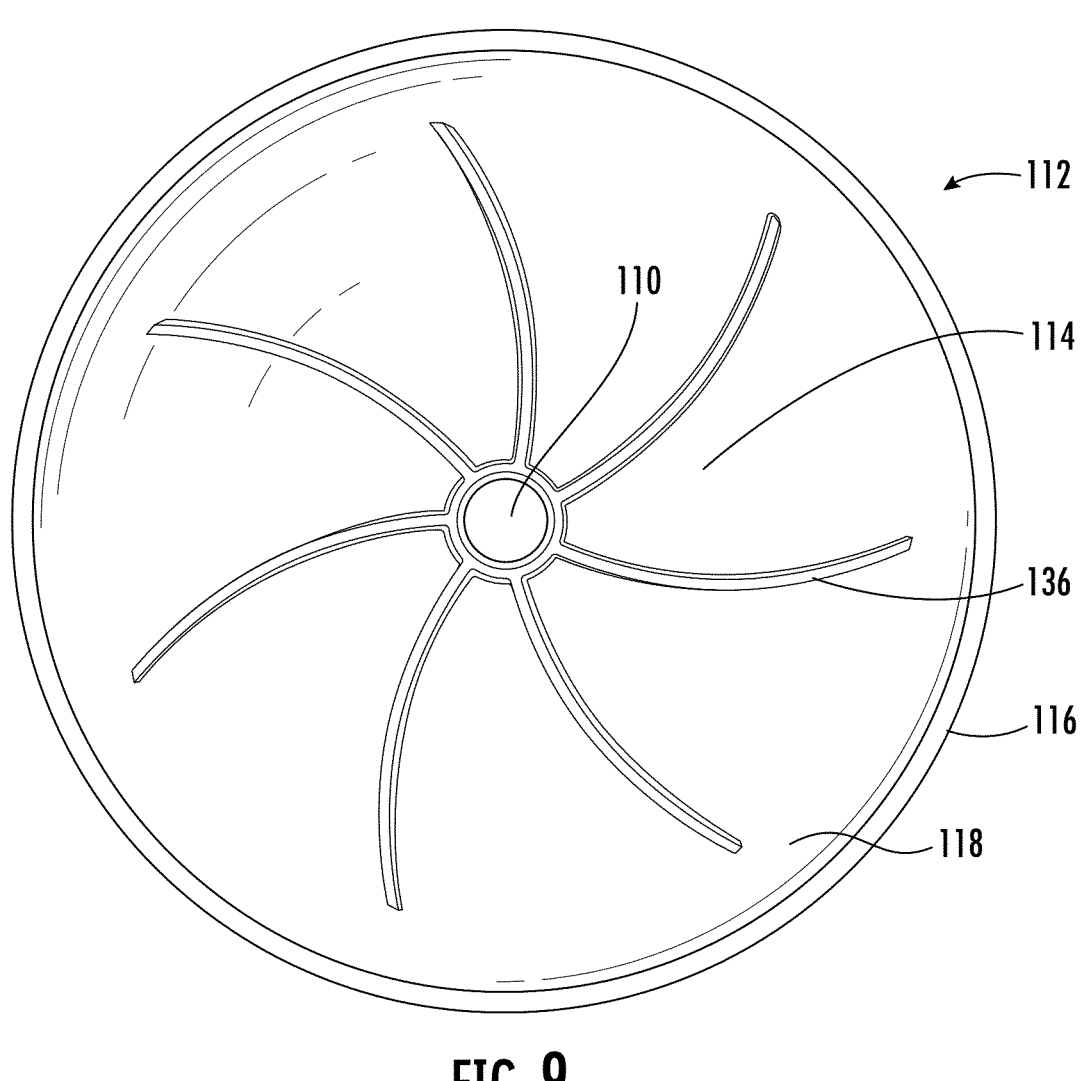
FIG. 9 is a bottom elevational view of the dome blower wheel attachment.
Figure 10:
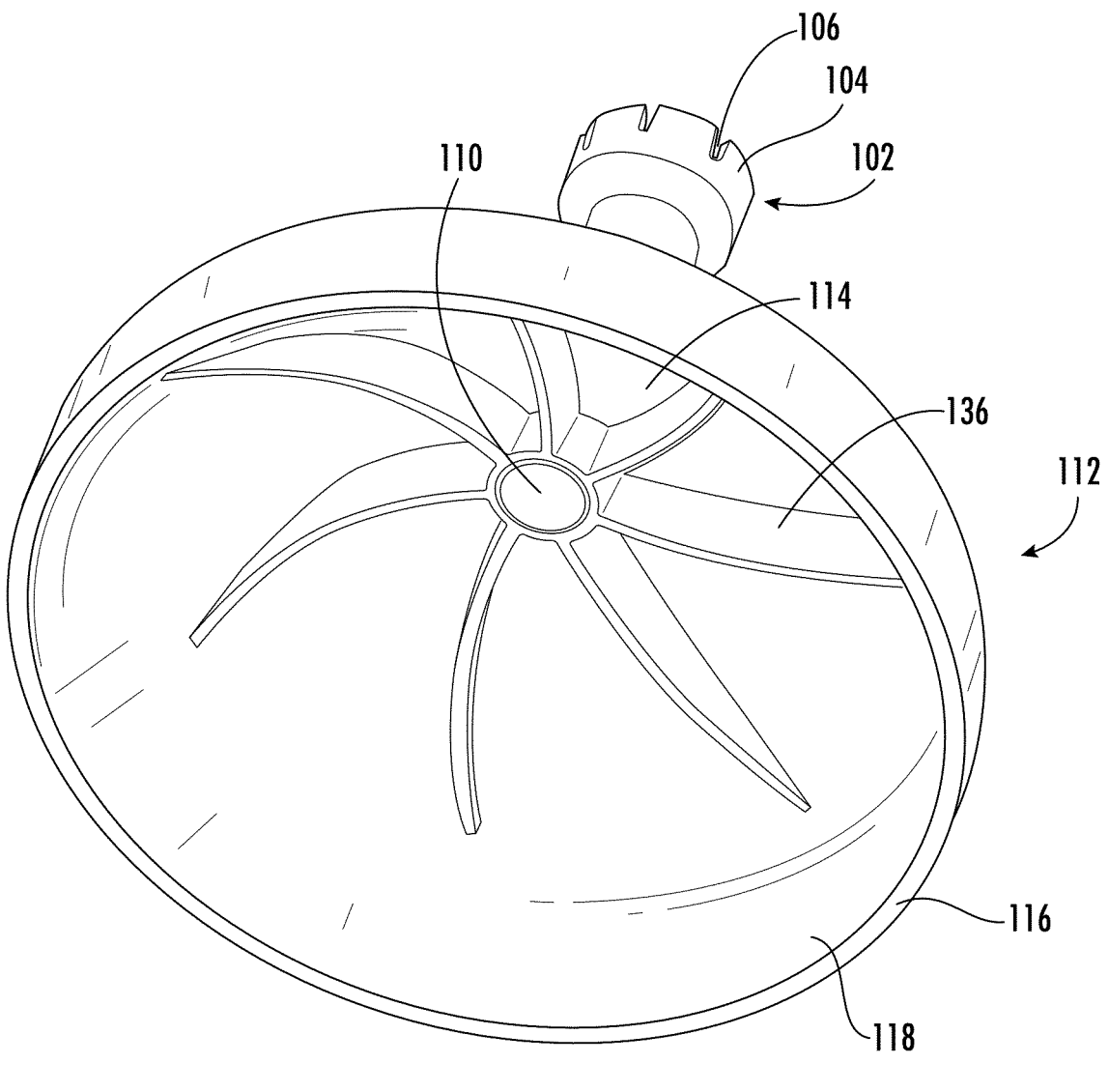
FIG. 10 is a bottom perspective view of the dome blower wheel attachment.
Figure 11:
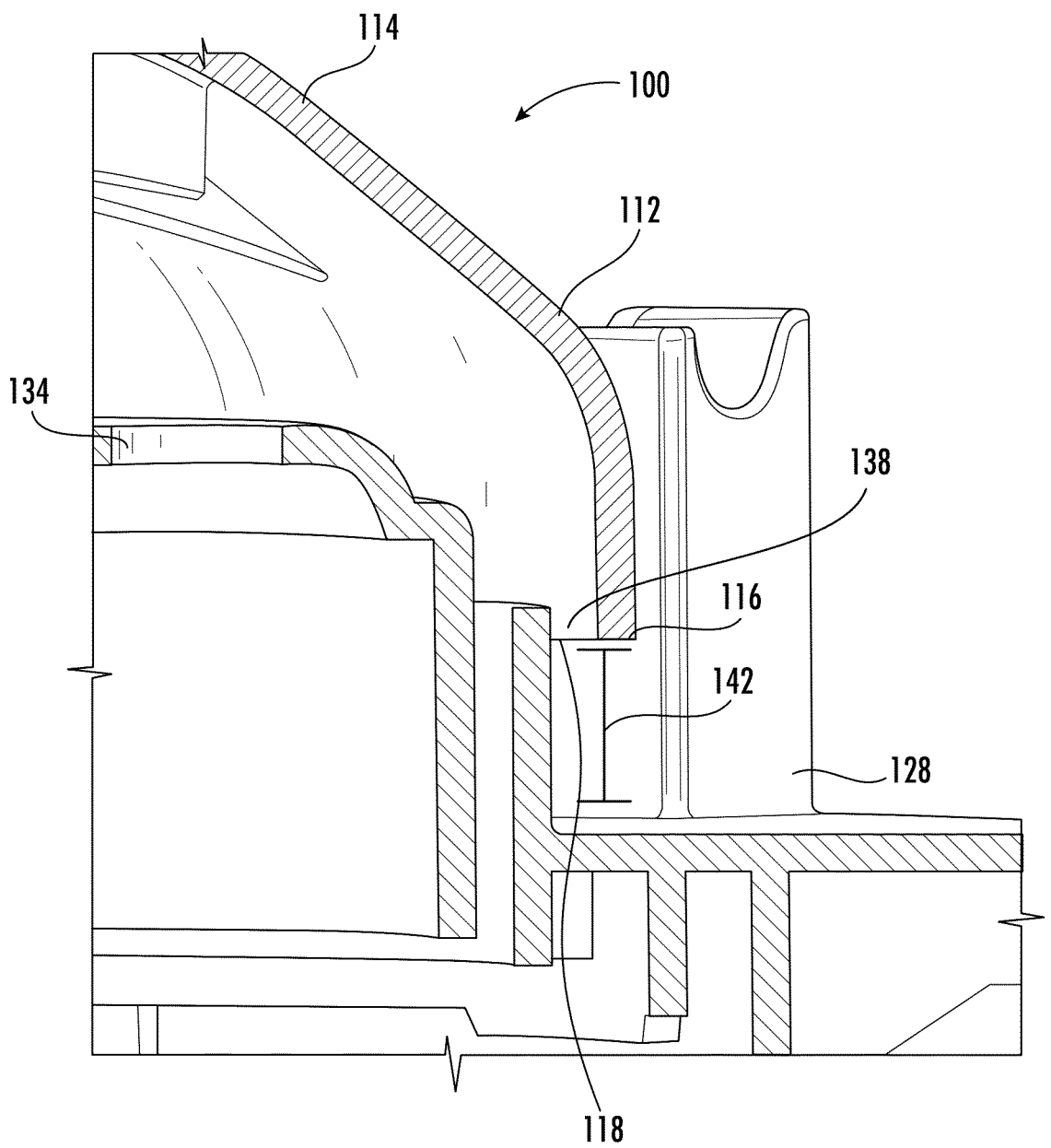
FIG. 11 is an enlarged fragmentary elevational view of the blower motor assembly.
Figure 12:
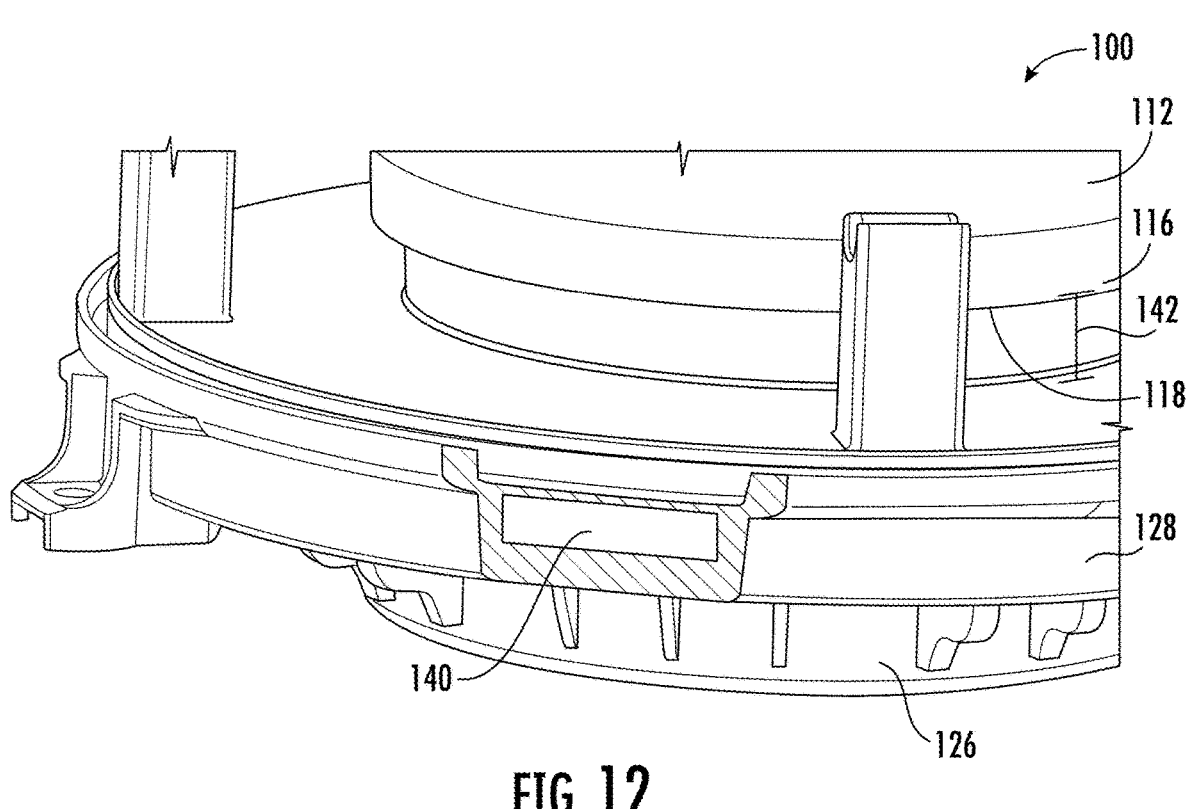
FIG. 12 is an enlarged fragmentary perspective view of the blower motor assembly showing a blower motor air inlet.
Figure 13:
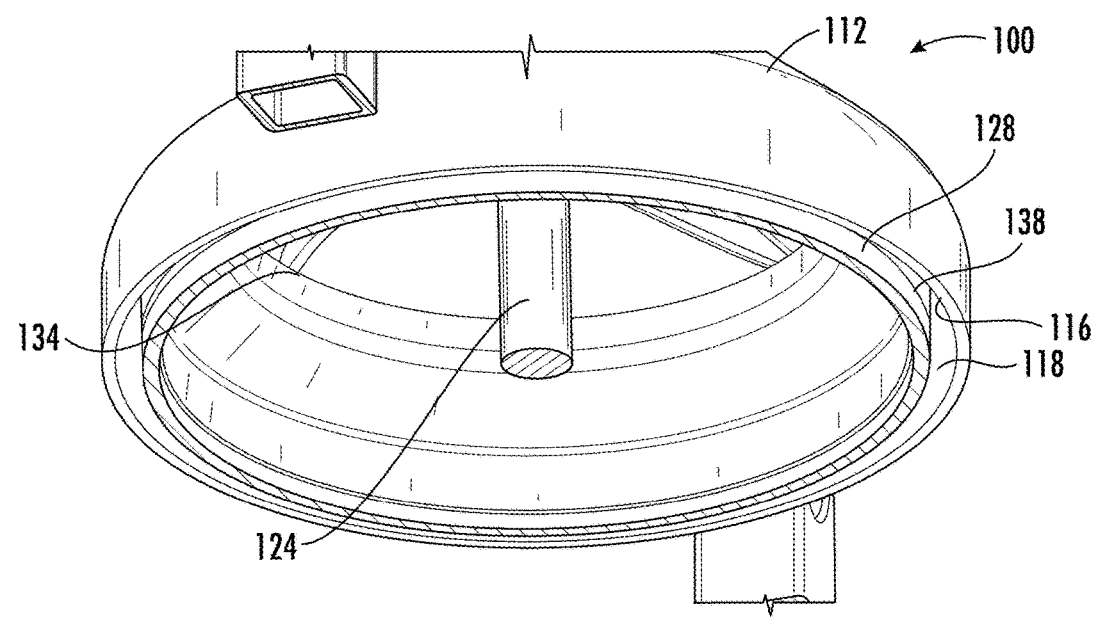
FIG. 13 is a fragmentary cross-sectional perspective view of the blower motor assembly.
Figure 14:
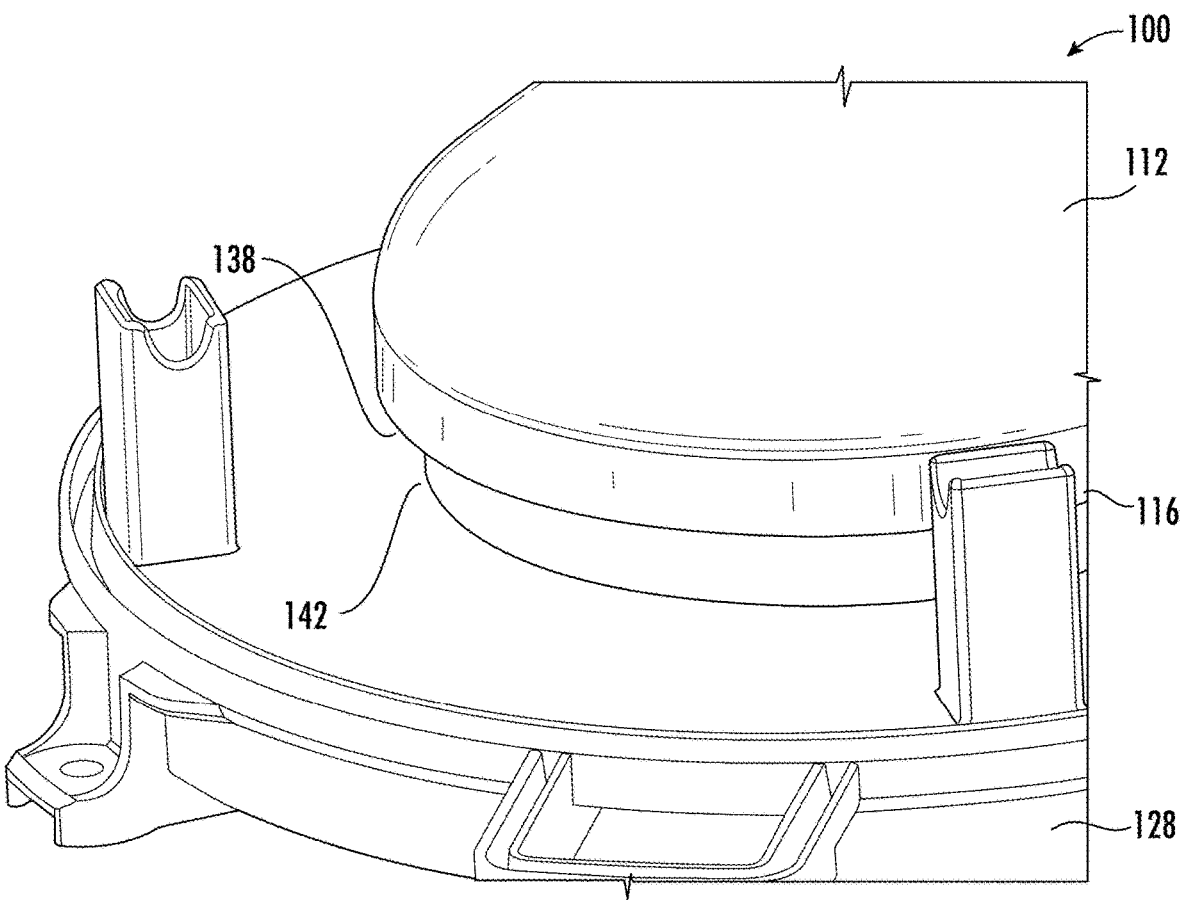
FIG. 14 is an enlarged fragmentary perspective view of the blower motor assembly.

FIGS. 8-10 show an embodiment of the dome blower wheel attachment 100 including one or more impellers 136 coupled to an underside of the dome 112. The one or more impellers 136 may be formed from any material as desired. In an embodiment, the one or more impellers 136 are formed from the same material as the dome 112. The one or more impellers 136 may be coupled to the underside of the first end 114 of the dome 112 using any suitable method or the one or more impellers 136 may be molded to the underside of the dome 112. The one or more impellers 136 have a generally arcuate shape and extend radially outwardly from the aperture 110. Due to their location and general structure, the one or more impellers 136 increase a strength and rigidity of the dome blower wheel attachment 100.

The one or more impellers 136 may be curved in either a counter-clockwise or clockwise direction. A direction of curvature of the one or more impellers 136 may be determined by a rotation direction of the output shaft 124. For example, if the output shaft 124 is configured to rotate in a clockwise direction when viewed through the opening 118, then the curvature of the one or more impellers 136 may be configured to cause air to flow away from and out of the dome blower wheel attachment 100. If the output shaft 124 is configured to rotate in a counter-clockwise direction when viewed through the opening 118, then the curvature of the one or more impellers 136 may be configured in an opposite direction of the previous example in order to cause air to flow away from and out of the dome blower wheel attachment 100.

The one or more impellers 136 may be configured to push air flow away from and out of the dome 112 through a horizontal gap 138 as shown in FIGS. 11-14. The horizontal gap 138 is illustrated best in FIG. 11 and is the space formed between the edge of the second end 116 of the dome 112 and the housing 128 of the blower motor assembly 10 surrounding the rotor 134. The gap 138 may be any size as desired. In one embodiment, an area of the gap 138 exceeds an area of the one or more blower motor air inlets 140 which ensures that the blower motor assembly 10 does not become pressurized.

Additionally, and as further illustrated by FIGS. 11-14, the dome blower wheel attachment 100 may be coupled to the output shaft 124 so the second end 116 is spaced from the housing 128, creating a gap 142. The gap 142 may be defined as the space between a bottom edge of the second end 116 of the dome 112 and the housing 128 of the blower motor assembly 10 surrounding the rotor 134. The gap 142 may be any size as desired. In one embodiment, the size of the gap 142 is greater than 6 mm to prevent ice buildup within the gap 142.

Figure 15:
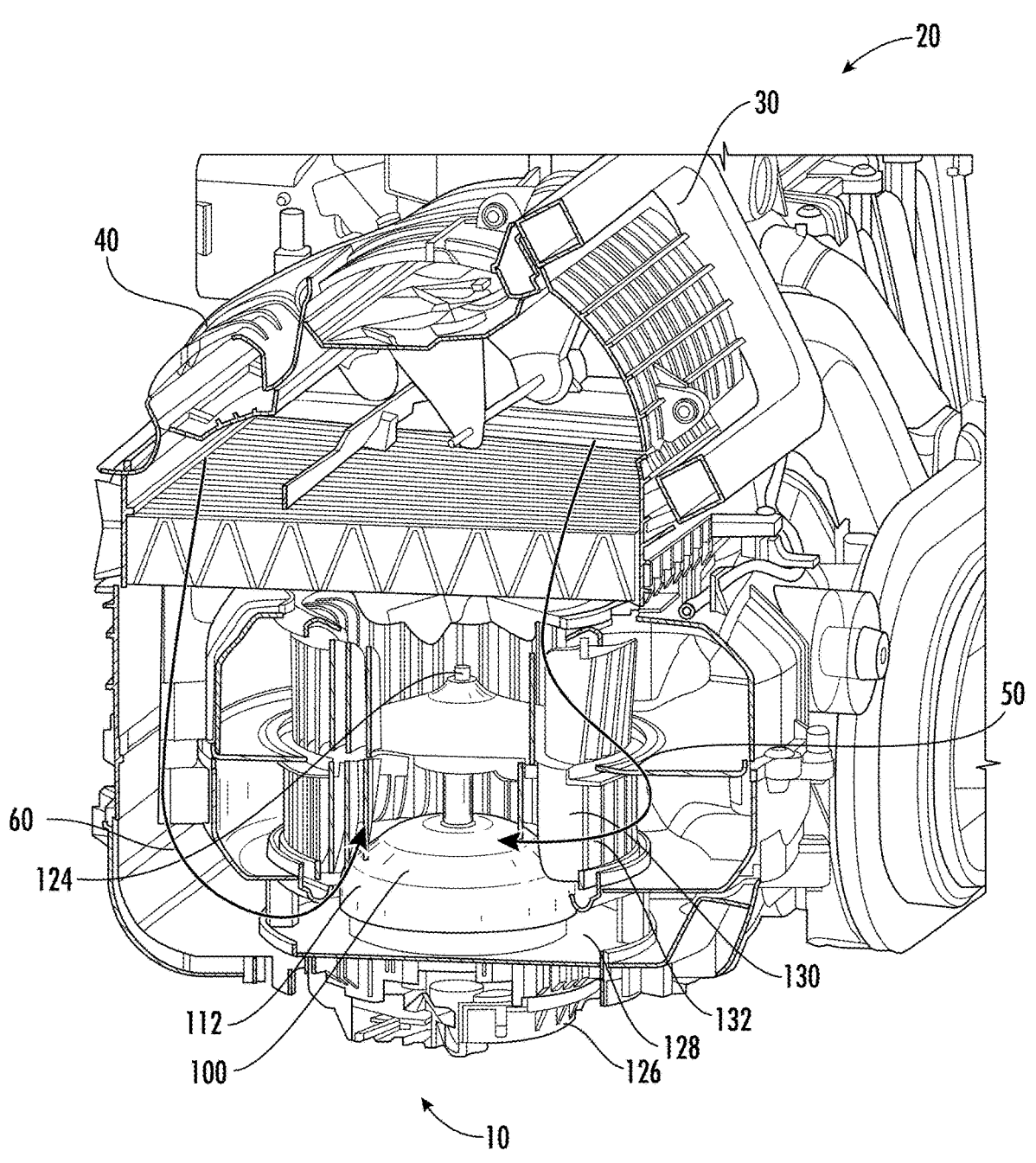
FIG. 15 is an enlarged fragmentary cross-sectional perspective view of the dome blower wheel attachment, the blower motor assembly, and the automotive ventilation unit and illustrating the air flow paths that carry water particles.

FIG. 15 shows the automotive ventilation unit 20 and the blower motor assembly 10 and flow of fresh air designated by arrow 50 and flow of recirculated air designated by arrow 60, and further depicting the water particles in the flow of air that the dome blower wheel attachment 100 protects the rotor 134 and blower motor 126 from. As previously discussed, the dome blower wheel attachment 100 protects the rotor 134 and blower motor 126 from water droplets that infiltrate the automotive ventilation unit 20 and the blower motor assembly 10 through the HVAC fresh air inlet 30, as illustrated by fresh air inflow arrow 50. In addition, the dome blower wheel attachment 100 protects the rotor 134 and blower motor 126 from water droplets that infiltrate the automotive ventilation unit 20 and the blower motor assembly 10 through the HVAC recirculated air inlet 40, as illustrated by recirculated air flow arrow 60. In particular, the one or more impellers 136 in the dome blower wheel attachment 100 cause air to flow away from and out of the semi-circular dome 112, preventing water droplets from the air flow illustrated by recirculated air flow arrow 60 from infiltrating the rotor 134 and the blower motor 126. The air flow created by the one or more impellers 136 also prevents water from building up in the horizontal gap 138 and vertical gap 142, further protecting the rotor 134 and the blower motor 126 from water droplets. This, in turn, prevents the rotor 134, the blower motor 126, and other key elements of the blower motor assembly 10 from corrosion or short circuiting.

The rotatable dome blower wheel attachment 100 described herein is an improvement over blower motor attachments of the prior art. One such improvement is the coupling of the dome blower wheel attachment 100 to the rotatable output shaft 124 of the blower motor 126 and to the blower motor wheel 130. This configuration protects the rotor 134 from water that is sprayed through the blower motor wheel 130 and ensures that that the dome blower wheel attachment 100 rotates at the same speed and direction as the blower motor wheel 130 and the rotor 134. Another improvement is that the dome blower wheel attachment 100 is cheaper and less complicated than blower motor attachments of the prior art because it does not require a specialized flange tool for installation and does not attach directly to the housing 128. Finally, the dome blower wheel attachment 100 may also have one or more impellers 136 coupled to the underside of the semi-spherical dome 112 to serve the dual purpose of directing airflow, and therefore water droplets, away from the rotor 134 while still protecting the rotor 134 from water that is sprayed through the blower motor wheel 130.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A blower motor assembly comprising:
a motor housing;
a blower motor disposed in the motor housing;
a rotatable rotor coupled to the blower motor;
a rotatable output shaft coupled to the rotor;
a rotatable blower motor wheel coupled to the output shaft; and a rotatable dome blower wheel attachment coupled to the output shaft, the dome blower wheel attachment further comprising:
a connection flange having a first end configured to be rotatably coupled to an output shaft of a blower motor assembly; and
a semi-spherical dome coupled to a second end of the connection flange, the dome further comprising:
one or more radially outwardly extending impellers formed on an underside of the dome.

2. The blower motor assembly according to claim 1, the motor housing further comprising one or more blower motor air inlets formed in the motor housing.

3. The blower motor assembly according to claim 1, wherein a first gap is formed between the dome and an inner wall of a flange of the blower motor housing.

4. The blower motor assembly according to claim 3, wherein an area of the first gap is larger than an area of the one or more blower motor air inlets.

5. The blower motor assembly according to claim 3, wherein a second gap is formed between the dome and a bottom wall of the flange of the blower motor housing.

6. The blower motor assembly according to claim 1, the connection flange further comprising one or more interlocking ribs formed on the first end thereof and a second end opposite the first end.

7. The blower motor assembly according to claim 6, the connection flange further comprising an axially extending aperture formed in the connection flange between the first end and the second end thereof.

8. The blower motor assembly according to claim 1, the dome further comprising a first end and a second end opposite the first end, the second end having an opening formed therein and a larger circumference than a circumference of the first end.

9. The rotatable dome blower wheel attachment according to claim 1, wherein the one or more radially outwardly extending impellers are arcuate.

\* \* \* \* \*